United States Patent [19]
Ise et al.

[11] Patent Number: 5,325,483
[45] Date of Patent: Jun. 28, 1994

[54] IMAGE INFORMATION RETRIEVAL NETWORK SYSTEM

[75] Inventors: Hirotoshi Ise, Yokohama; Haruo Takeda, Kawasaki, both of Japan

[73] Assignee: Hitachi, Ltd., Tokyo, Japan

[21] Appl. No.: 504,303

[22] Filed: Apr. 4, 1990

[30] Foreign Application Priority Data

Apr. 7, 1989 [JP] Japan ................... 1-089288

[51] Int. Cl.$^5$ .............................. G06F 3/12
[52] U.S. Cl. .................................. 395/162
[58] Field of Search ... 364/518, 521, 522, 200 MS File, 364/900 MS File, 930, 493; 340/747, 750; 395/162, 163, 164, 147; 345/113, 115, 116

[56] References Cited

U.S. PATENT DOCUMENTS

| | | | |
|---|---|---|---|
| 4,412,294 | 10/1983 | Watts et al. ................. | 364/518 |
| 4,641,263 | 2/1987 | Pearlman et al. ............ | 364/900 |
| 4,694,406 | 9/1987 | Shibui et al. ................ | 364/518 |
| 4,787,040 | 11/1988 | Ames et al. .................. | 364/424.01 |
| 4,918,622 | 4/1990 | Granger et al. .............. | 364/518 |
| 4,939,670 | 7/1990 | Freiman et al. ............. | 364/519 |
| 4,941,193 | 7/1990 | Barnsley et al. ............ | 382/56 |
| 4,943,866 | 7/1990 | Barker et al. ................ | 358/335 |

Primary Examiner—Phu K. Nguyen
Attorney, Agent, or Firm—Antonelli, Terry, Stout & Kraus

[57] ABSTRACT

In an image information retrieval network system having a file station storing a plurality of images to be searched in the form of compressed data by means of coding and at least one terminal station connected to the file station via a transmission line, the file station includes a processor for decoding compressed image data read from an image file to restore an original image, an image processor for processing the restored image data such as extracting a partial area thereof, and a coding processor for data-compressing the processed image data by means of coding. When a user at the terminal station designates a search condition, display mode, and control information for image processing, the file station reads the images satisfying the search condition from the image file, and causes the searched images to be subjected to the image processing designated by the control information. The processed image data are transmitted to the terminal station in the form of compressed data by means of coding.

8 Claims, 13 Drawing Sheets

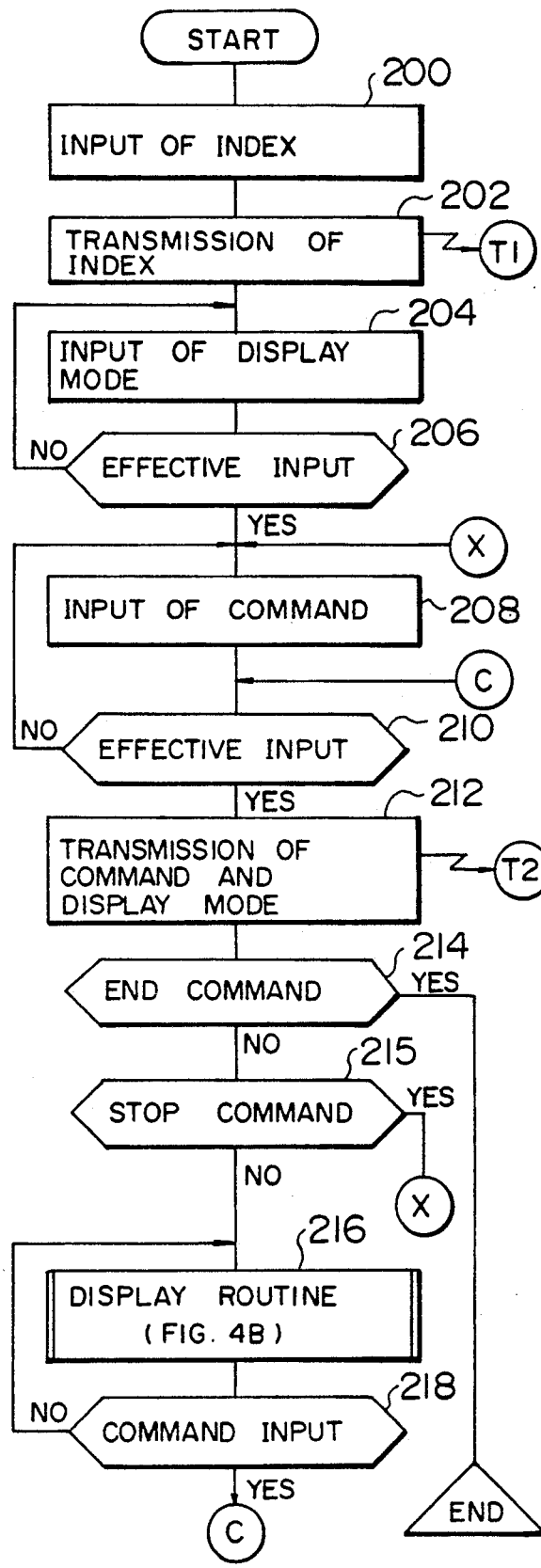
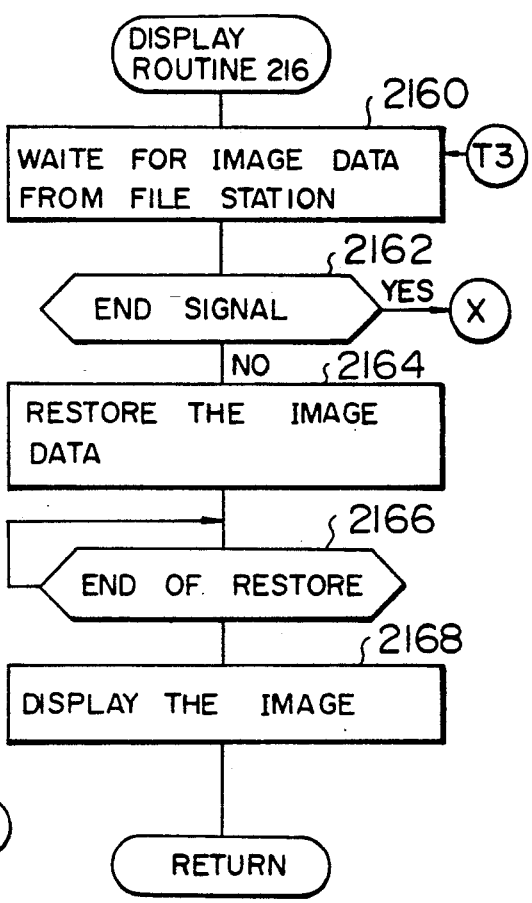

| IMAGE NO. 30 | INDEX 31 | TOP ADDRESS OF IMAGE DATA BLOCK 32 | SIZE OF IMAGE DATA BLOCK 33 | |
|---|---|---|---|---|
| 1 | NAME | $n_1$ | $s_1$ | 34-1 |
| ⋮ | ⋮ | ⋮ | ⋮ | |
| i | NAME | $n_i$ | $s_i$ | 34-i |
| ⋮ | ⋮ | ⋮ | ⋮ | |
| $l$ | NAME | $n_l$ | $s_l$ | 34-$l$ |

| | |
|---|---|
| TYPE OF IMAGE PROCESSING | ~51 |
| X-COORDINATE OF PARTIAL REGION LEFT SIDE : X | ~52 |
| Y-COORDINATE OF PARTIAL REGION TOP SIDE : Y | ~53 |
| WIDTH OF PARTIAL REGION : LX | ~54 |
| HEIGHT OF PARTIAL REGION : LY | ~55 |
| WIDTH OF WHOLE IMAGE : DX | ~56 |
| HEIGHT OF WHOLE IMAGE : DY | ~57 |

(table labeled 50)

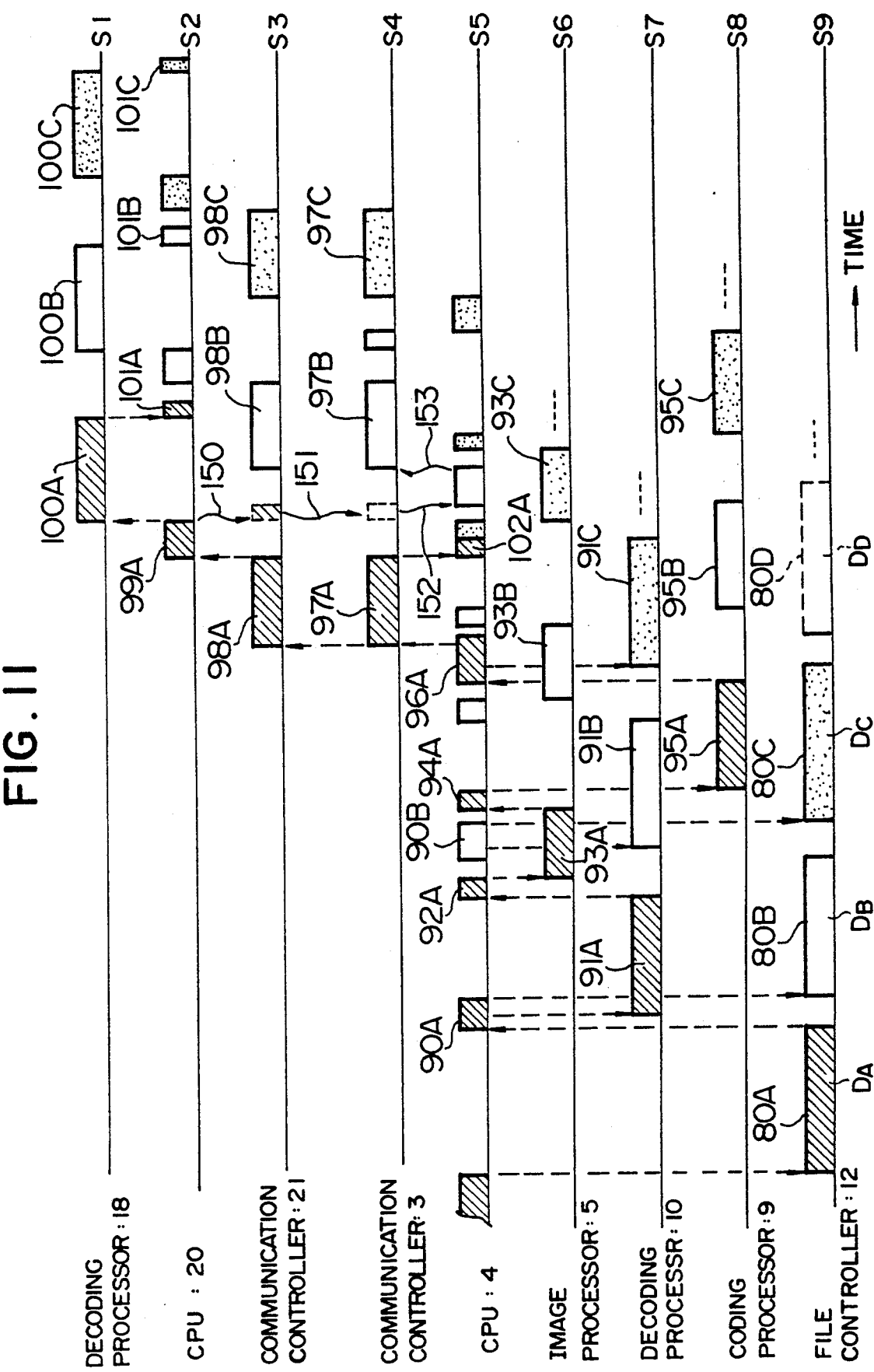

IMAGE INFORMATION RETRIEVAL NETWORK SYSTEM

BACKGROUND OF THE INVENTION

Field of the Invention

The present invention relates to an image information retrieval system, and more particularly to a searched image transmission control in a network system constructed of an image file station and a plurality of terminal stations (retrieval or search stations) for searching and displaying images

Description of the Related Art

Recently, a text image file system (electronic file) using a large capacity optical disk has drawn attention as a new text management system. Since an optical disk has a large data storage capacity and can store a large amount of data, such as image data, it can be used as means for storage of text image information such as account books, design drawings, and contract documents.

In searching text information from a remote site by using a Local Area Network (LAN) or communication lines, it is preferable to use indexes, such as a text name, classification name, keyword and the like. However, if a complicated index is used, many operations have to be perform in order to store text images to which such complicated indexes are added, and in addition it becomes difficult in many cases to re-collect such a complicated index when a search is made.

Apart from the above, stored image data having complicated indexes added thereto are usually searched by using only a simple index. In such a case, a plurality of candidate image data searched by using only a simple index, such as a classification name, are sequentially displayed on a display screen, and an operator is required to visually check the contents of each displayed image data in a search for an objective image data.

One of the methods of displaying searched text image data sequentially and at high speed on a display screen has been proposed by a copending U.S. application Ser. No. 437,106 filed Nov. 16, 1989, and assigned to the present assignee, the contents of which are incorporated herein by reference.

In visually searching for an objective image data, the whole image data is not always required to be displayed, but a partial area thereof, such as a title, author, abstract or the like, can suffice in many cases. One of the methods of displaying a partial area of image data has been proposed by a copending U.S. patent application Ser. No. 95752 filed Sep. 11, 1987, and assigned to the present assignee, the contents of which are also incorporated herein by reference. According to this method, the position on an image file of the partial area of an original image or reproduced image designated by an operator is determined in accordance with the position information included in an index record. Accordingly, only the data at the position of the partial area of the image data can be read from the image file.

There is also disclosed in Japanese Patent Laid-open Publication JP-A-62-63374 an image information retrieval network system. According to this system, an image file station using an optical disk storing text images is connected via an communication line to a terminal control unit to which a plurality of terminal stations for entering image retrieval conditions and the like by an operator are also connected. The image file station outputs a text image requested by each terminal station via the terminal control unit to the requesting terminal station. In an image file system, image data is generally stored in a memory after coding in order to compress the image data quantity per one text.

In the above known network system, the terminal control unit is provided with an image processing unit for expanding the compressed image data received from the communication line, and an image buffer memory for temporarily storing a plurality of pages of text image data. The compressed image data sequentially transmitted from the image file station is expanded at the terminal control unit, and outputted to the image data requesting terminal station. The image processing unit of the terminal control unit has a function to enlarge/reduce an image, and a function to extract a desired partial area of an image. If an operator at a terminal station request a to display of only a specified partial area of each text image, the terminal control unit extracts the partial image and outputs it to the display screen of the terminal station.

In the image retrieval system described above, on the side of the image file station, the whole image data of each text image is read from the optical disk and transmitted to the terminal station or terminal control unit, and on the side of the terminal station, the partial area requested by an operator is extracted. With this image retrieval system, however the speed at which image data may be read from the optical disk is restricted by the image data transmission time of the communication line, thereby resulting in a difficulty of speeding up the renewal speed (of shortening the renewal synchronization interval) of images to be displayed at the terminal station if a plurality of pages of image data are to be transmitted thereto.

SUMMARY OF THE INVENTION

It is an object of the present invention to provide an image information retrieval network system wherein a terminal station at a remote site from an image file station is allowed to visually check sequentially and at high speed a plurality of displayed images.

It is another object of the present invention to provide an image information network system which capable of sequentially displaying at high speed specified partial areas, designated by an operator, of text images on the display screen of the terminal station.

It is a further object of the present invention to provide an image data displaying method whereby images satisfying a search condition designated by an operator at the terminal station are searched from a plurality of images stored in the image file station, and the specified partial areas, designated by the operator, of the searched images are sequentially displayed at high speed.

In order to achieve the above objects, an image information retrieval network system according to this invention has a file station and at least one terminal station connected to the file station via a transmission line. The file station has a storage for storing a plurality of pages of images in the form of compressed image data by means of coding; means for reading from said storage compressed image data satisfying the requirement of the terminal station; a decoder for decoding the compressed image data read from the storage to restore original image data; an image processor for processing restored original image data and converting the restored original image data into image data satisfying the requirement of the terminal station; a coder for coding and data-compressing the processed image data; and a transmitter for transmitting the compressed image data read from storage or compressed image data processed by the encoder to the terminal station via the transmission line, and for receiving control information transmitted from said terminal station via the transmission line. The terminal station includes a display device for displaying a searched image; an input device operated upon by a user for designating first and second control information, the first control information representing the condition of an image search to be executed at the file station, and the second control information including information for designating a display mode used in displaying the searched image on the display devices and the information identifying image processing to be executed at the file station; a transmitter for transmitting the first and second control information to the file station via the transmission line and for receiving the compressed image data transmitted from the file station; a decoder for decoding said compressed image data received by said reception means to restore original image data; and means for outputting the image data restored by the decoder to the display device. At the file station, image data is read from the storage in accordance with first control information received from the terminal station, and image processing by the image processor and transmission of the compressed image data are executed in accordance with the second control information.

According to the present invention, if a user wishes to display only specified partial areas of searched images, for example, the file station extracts the partial areas of the searched images and data-compresses the extracted partial areas by means of coding for the transmission thereof to the terminal station. Therefore, the transmission data amount and required transmission time can be reduced. Further, a read operation for reading image data from the storage, and the operations by the decoder, image processor and coder can be executed in parallel. With this parallel operation, the file station can prepare respective image data to be transmitted to the terminal station in a short time. Therefore, in addition to the reduction of required transmission time, the user of the network system of this invention can display a plurality of searched images on the terminal display quickly.

The foregoing and other objects, advantages, manner of operation and novel features of the present invention will be understood from the following detailed description when read in connection with the accompanying drawings.

BRIEF DESCRIPTION OF THE DRAWINGS

FIG. 4A is a flow chart illustrating the detailed operation by the terminal station;

FIG. 4B is a flow chart illustrating the detailed operation of the display routine 216 shown in FIG. 4A;

FIG. 8 shows an example of the table provided at the file station for storing the image processing control information;

FIG. 11 is a timing chart for explaining high speed image data transmission from the file station to the terminal station according to another embodiment.

DESCRIPTION OF THE PREFERRED EMBODIMENTS

Figure 1:
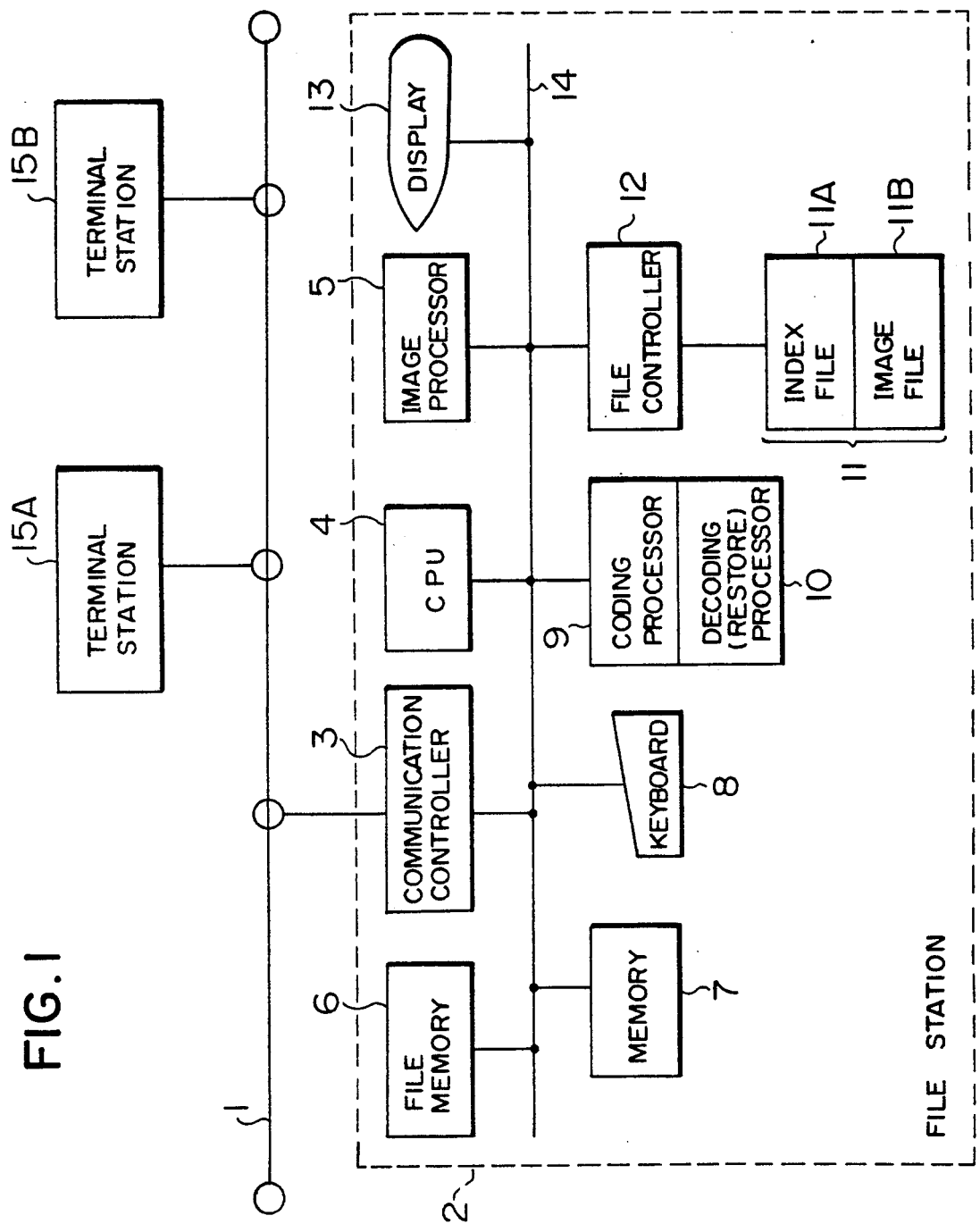
FIG. 1 is a block diagram showing the overall arrangement of an image information retrieval network system according to the present invention.

FIG. 1 shows an embodiment of an image information retrieval network according to this invention, wherein an image file station (hereinafter called a file station) 2 is connected via a transmission line 1 to terminal stations (retrieval or search stations) 15A and 15B.

The file station 2, includes a CPU 4 for controlling the entirety of the file station 2, an image processor 5 for performing various processings such as image enlargement, reduction, cut-out (extraction) and the like, a file memory 6 for storing character data, a memory 7 for storing image data, encoded image data, or the like, and a keyboard 8 for entering character data such as commands. The file station 2 also has a processor 9 dedicated for use in encoding image data, a processor 10 dedicated for use in decoding encoded image data, an index file 11A for storing index data used in searching image data, an image file 11B for storing registered image data in a coded and compressed form, a controller 12 for the data read/write control of the index file 11A and image file 11B, a display 13 for displaying image data, and character data such as commands, and a file station bus 14 for the interconnection of the above components.

Figure 2:
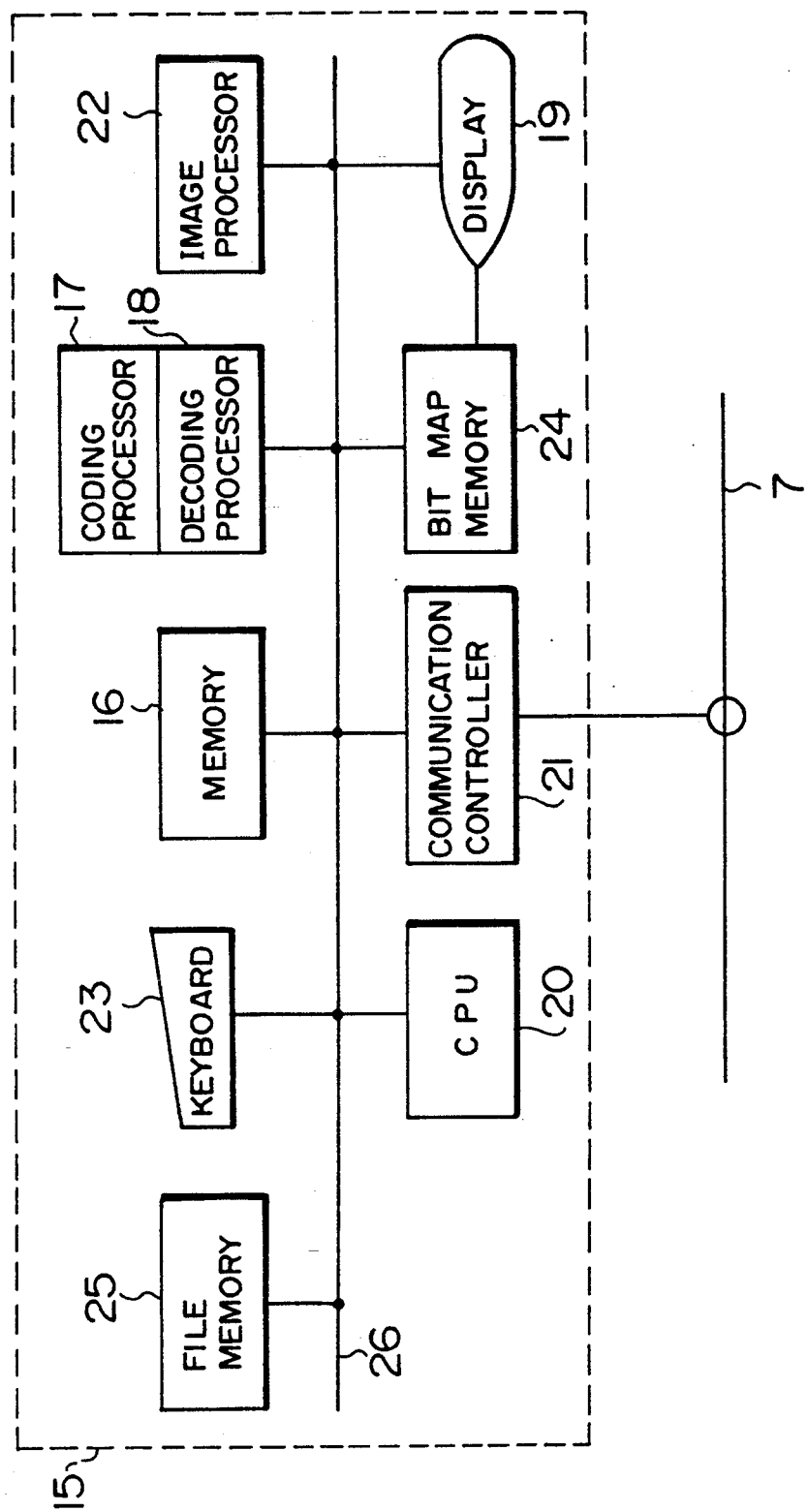
FIG. 2 is a block diagram showing the structure of a terminal station (retrieval of search station)

The terminal station 15 (15A, 15B) is constructed as shown in FIG. 2, of a memory 16, coding processor 17 similar to the decoding processor 10, decoding processor 18 similar to the coding processor 9, display 19, CPU 20, image processor 22 similar to the processor 5, keyboard 23, bit map memory 24, file memory 25 similar to the file memory 6, and terminal station bus 26.

Figure 3A:
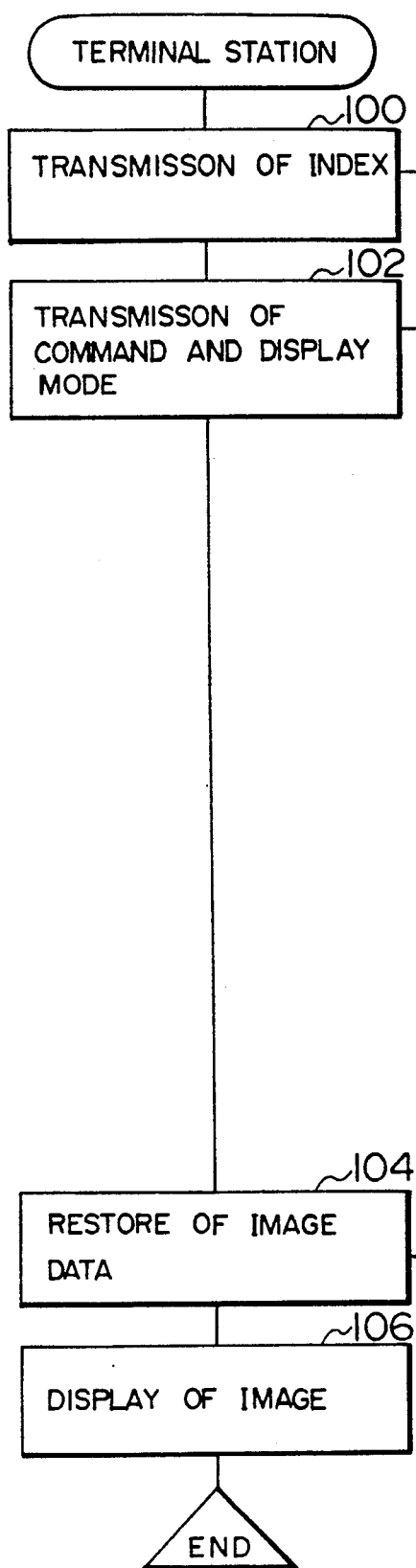
FIG. 3A is a flow chart illustrating the outline of the operation by the terminal station.
Figure 3B:
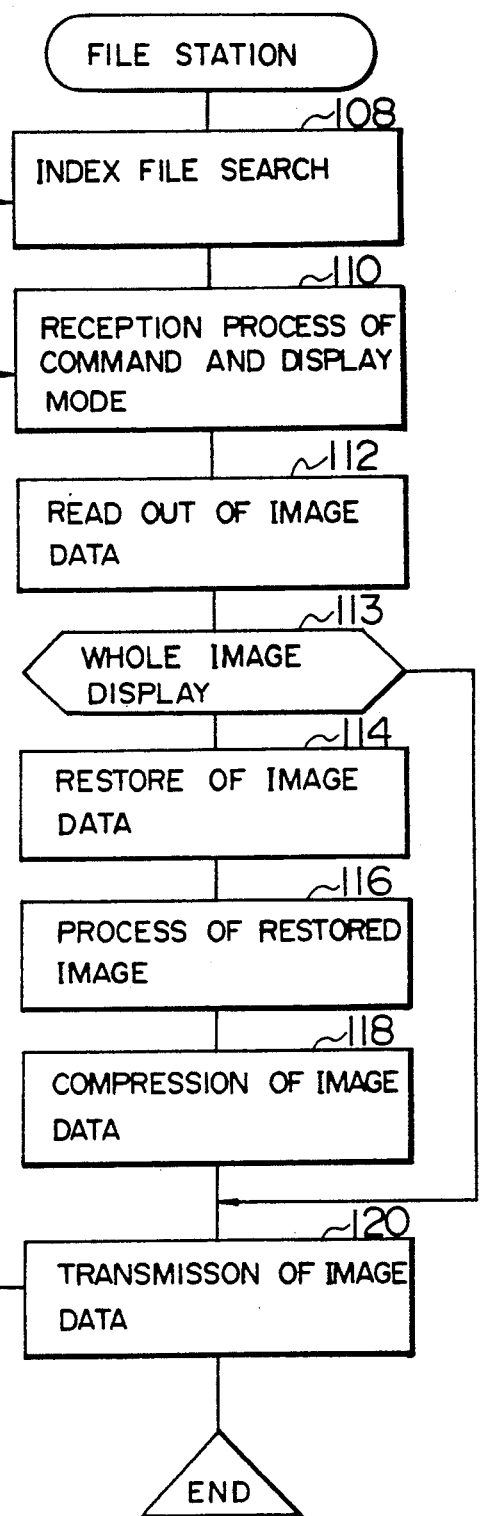
FIG. 3B is a flow chart illustrating the outline of the operation by the file station.

The outline of the operation by the image information retrieval network will be described with reference to FIG. 3A showing the operation procedure by the terminal station and FIG. 3B showing the operation procedure by the file station.

When an operator enters at step 100 an index (first control information) necessary for the retrieval of an image, the index information is transmitted from the terminal station 15 to the file station 2. At step 102, page turning control commands are entered. The page control commands are used for discriminating between automatically turning pages to be visually searched on the screen (automatic page turning) and manually turning pages (manual page turning), and for designating the output order (forward or reverse direction) of searched images. Also entered at this step 102 are the display mode designation data and control data necessary for the image processing, the display mode designating data being indicative of the type (e.g., display mode such as displaying the whole of each image as it is, extracting image data to display a specified partial area thereof, thinning image data to display a reduced image thereof, or the like) of image processing of searched images.

On the side of the file station 2, upon reception of the index information from the terminal station at step 108, the index file 11A is accessed to form an address table for image data to be transmitted to the terminal station. Next, upon reception, at step 110, of the image display control information (second control information) such as the page turning commands and display mode designating information, compressed image data starts being read from the image file 11B while referring to the address table. If the whole image display mode has been designated (step 113), the read-out compressed image data is transmitted to the terminal station without processing the data at the image processor 5 (step 120). If the partial image display mode or reduced image display mode has been designated, the compressed image data is decoded by the decoding processor 10 to restore original image data (step 114), and the original image data is processed by the image processor 5 in order to extract the partial image or perform other necessary operations (step 116). The processed image data is again compressed by the coding processor 9 at step 118, and transmitted to the terminal station 15 (step 120). The above-described operations starting from reading compressed image data from the image file to transmitting the data to the terminal station are repeated for all searched images.

On the terminal station 15 side, compressed image data sequentially received from the file station is decoded at step 104 by the decoding processor 17 to restore original image data which is then outputted to the display 19 for display on the display screen at step 106.

FIG. 4A is the control flow chart illustrating the detail of the operation by the terminal station.

An operator first enters index data from the keyboard 23, the index data, such as a text title, classification or the like being used as a search key (step 200). The index data is transmitted via the communication controller 21 to the transmission line 1 (step 202).

Figures 6, 7:
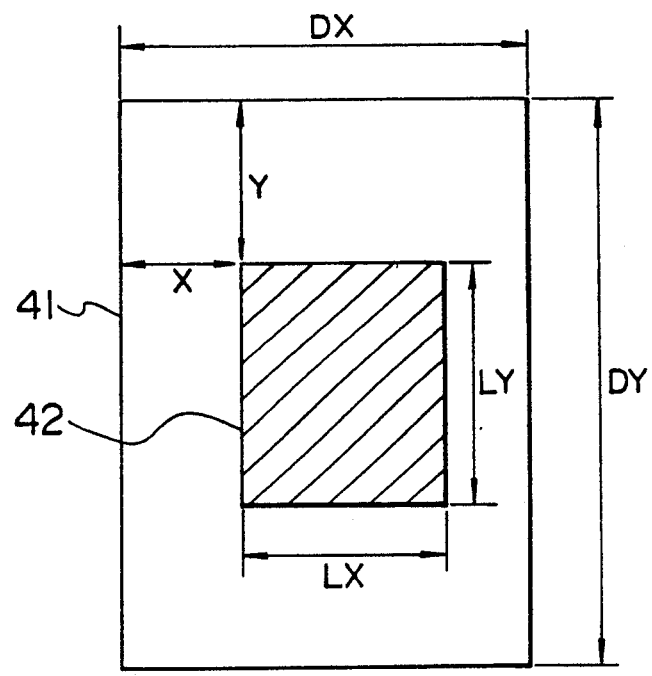
FIG. 6 is a diagram showing an example of defining a partial image area.
FIG. 7 shows an index table (image data address table) for storing the results of index search.

Next, the operator enters from the keyboard 23 the display mode designation information (whole image display, partial image display, or reduced image display) and the control information necessary for the image processing. If the partial image display is to be requested, there are designated, for example as shown in FIG. 6, the right side x-coordinate value (X), top side y-coordinate value (Y), width (LX) and height (LY) of a partial area (rectangular), where the width and height of an original image 41 are represented by DX and DY, respectively. The partial area may be designated such that one of N-divided blocks of an original image are identified, such as identifying the upper half, lower half, or upper one fourth area of an original image. If the whole image display is to be requested, it is not necessary to enter such numerical data. The entered display mode designation information and image processing control information are checked at step 206 to see if they are effective or not. If the entered information is effective, the operator enters at step 208 the page turn-ing control commands which are checked at step 210 as to their effectiveness. The effective page turning commands are only certain commands in this embodiment, namely a command for sequentially displaying searched data in the forward direction or regular order, commands for displaying searched data one page after another in the regular order or in the reverse order in response to an instruction, a command for sequentially displaying searched data one after another in the reverse order, and an end command. For example, if the last image having an image number 1 is being displayed on the display screen and an operator enters the regular order display command, this command is regarded as ineffective.

The commands and control data entered by an operator are transferred to a communication buffer and transmitted via the communication processor to the file station 2 (step 212).

If the end command is entered, this program is terminated (step 214). Upon termination of the program, the flow may be controlled to return to step 200 whereat a next retrieval operation is waited for.

If a stop command for stopping the turning of pages is entered, the flow returns to step 208. If not, a display routine 216 is executed.

As shown in FIG. 4B, in the display routine 216, a reception of image data from the file station is waited for (step 2160). If an end signal indicative of a transmission completion of all searched image data is received from the file station (step 2162), the flow returns to step 208 shown in FIG. 4A whereat an input of a command by an operator is waited for. If image data is received from the file station, the received image data (compressed image data) is stored in a reception buffer area provided in the memory 16 to thereafter start restoring the original image data (step 2164). If the reception buffer and bit map memory 24 each having a capacity of a plurality of pages are provided, the restore processing may be executed in parallel with the reception operation of the next image data, and the restored image data may be outputted to an empty area of the bit map memory. Upon confirmation of a completion of the restore processing (step 2166), the bit map memory is switched to display the newly restored image data on the display 19 screen (step 2168).

After completion of the display routine 216 in FIG. 4A, it is judged at step 218 if the operator has entered a command. If there is an entered command, the flow advances to step 210, whereas if not, the display routine 216 is repeated.

With the above-described control, upon designation by an operator of a mode (automatic page turning mode) for continuously displaying searched images, the image data transmitted from the file station is automatically and sequentially displayed on the display screen. When an operator finds a desired image on the display screen, the stop command is entered which is transmitted to the file station 2 at step 212. The file station then intercepts the automatic transmission operation of the succeeding image data. Upon input of the stop command by the operator, the flow returns from the judgement step 215 back to step 208. The page turning operation at the display screen is stopped because the display routine 216 is not executed until a new command is entered.

Next, the operation of the file station 2 will be described in detail with reference to the control flow charts shown in FIGS. 5A to 5G.

The file station 2 is waiting for an index designation from the terminal station (step 220). When an index is designated, an index record or records having the designated index are searched from the index file 11A at step 222, to form an index table (image address table) 35 such as shown in FIG. 7 in the memory 7.

The index table 35 is constructed of l records 34-1 to 34-l of the designated index. Each record is constructed of an index 31, image data block top address 32, and image data block size 33. The index in this example includes only one classification "NAME". The index 31 may be constructed of a plurality of index attributes such as a number, registered date and the like, to thereby more specifically classify it. The table 35 is formed at step 222, for example, by searching the index satisfying the classification "NAME" from the index file and transferring each record to the table area of the table 35. The number of records is represented by a parameter l. After forming the index table, the buffer memory area on the memory 7 for use in reading image data from the image file 11B, the memory area for use in image processing, and a parameter (e.g., FLAG) are initialized (step 224).

Next, the command and image processing control data from the terminal station are waited for at step 225. The received image processing control data is temporarily stored in the file memory 6 in the form of a control table 50 as shown in FIG. 8 which is then referred to by the image processor 5.

If the received command is a search end command, the flow returns from step 226 to initialization step 220. If the received command is a page turning control command, a parameter FLAG is checked (step 227). If FLAG is "0", FLAG is set at "1" and image data count parameter i is initialized, respectively at step 228. The initial value for i takes "0" for the regular order page turning, and l+1 for the reverse order page turning.

At step 229 it is judged whether or not the display mode designation indicates the whole image display mode. If not, it is checked at step 230 to see if the page turning control command is the regular order display command or the reverse order display command. In the case of the regular order display command, the parameter i is incremented by "+1" at step 231. In the case of the reverse order display command, the parameter i is decremented by "−1" at step 232. On the other hand, if an affirmative is found at judgement step 229, it is checked at step 233 to see if the page turning control command is the regular order display command or the reverse order display command. In the case of the regular order display command, the parameter i is incremented by "+1" at step 234, and in the case of the reverse order display command, the parameter i is decremented by "−1" at step 235.

FIGS. 5B to 5E illustrate control sequences to be executed after steps 231, 232, 234 and 235, respectively.

Figure 5A:
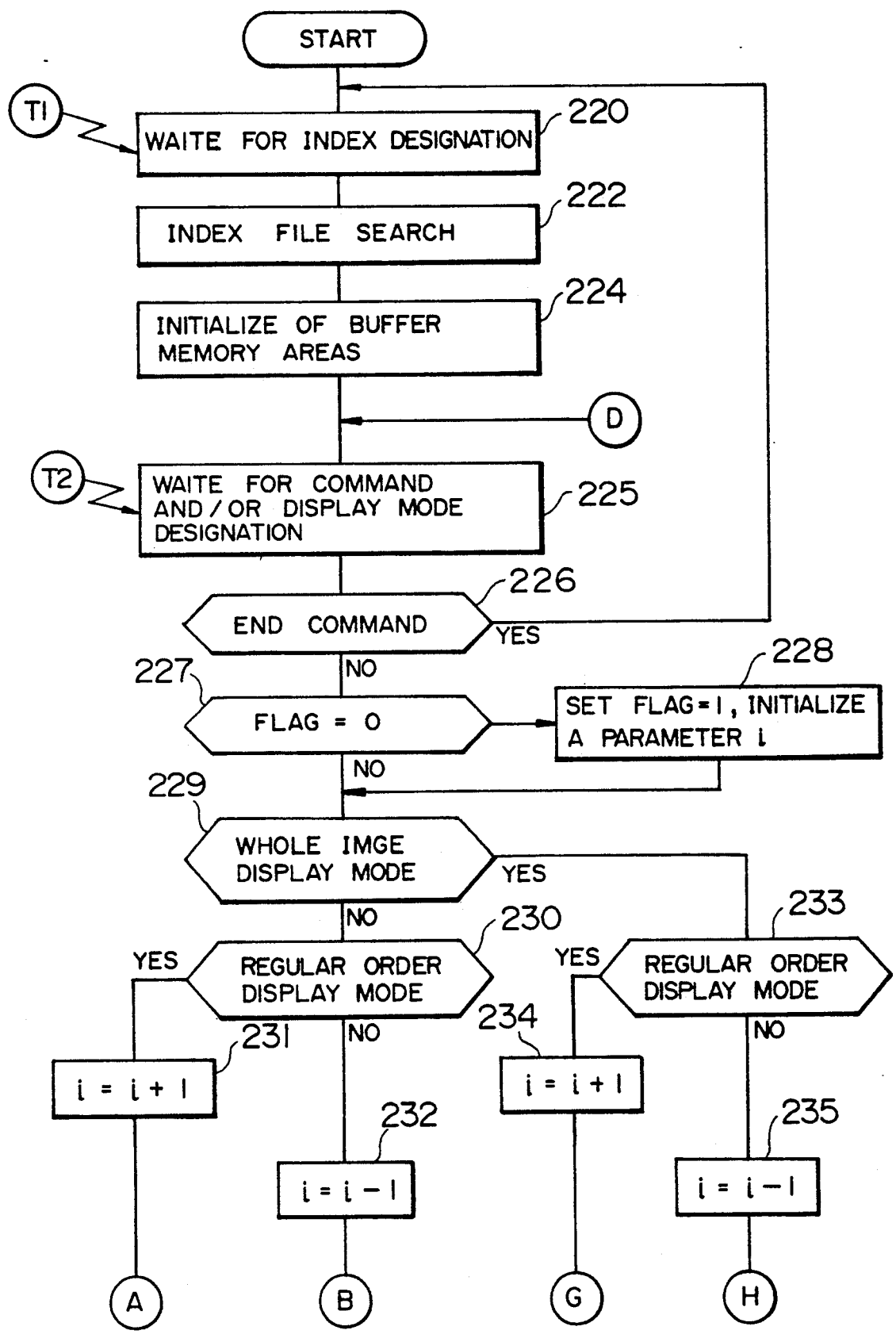
FIGS. 5A to 5E are flow charts illustrating the detailed operations by the file station.
Figure 5B:
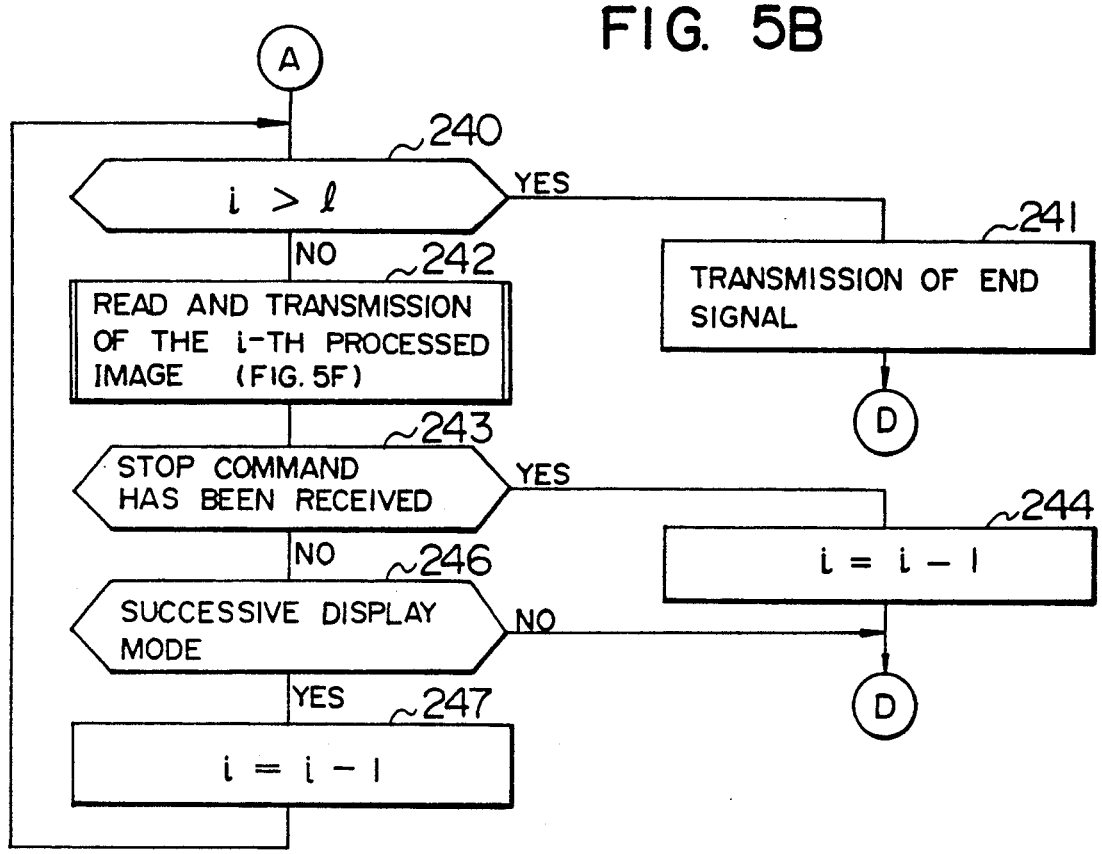

FIG. 5B illustrates the control sequence of the regular order page turning operation which requires image processing, such as extraction of a partial area. The image count parameter i is compared at step 240 with the parameter l representative of the total number of searched images. If i is larger than l, an end signal indicating that all searched image data has been transmitted is transmitted to the terminal station at step 241, and thereafter the flow returns to step 225 shown in FIG. 5A whereat a new command from a terminal station is waited for. If i is equal to or smaller than l, a sub-routine (SUB-1) shown in FIG. 5F is executed to transmit the processed image data (step 242), and it is checked whether or not a stop command has been received from the terminal station (step 243). If the stop command has been received, the parameter i is decremented by "−1" to return to step 225. If the stop command has not been received, it is checked at step 246 whether or not the designated display mode indicates a successive display (successive, regular order display). In the case of the successive display, the parameter l is incremented by "+1" to return to step 240. If not, the flow returns to step 225.

Figure 5C:
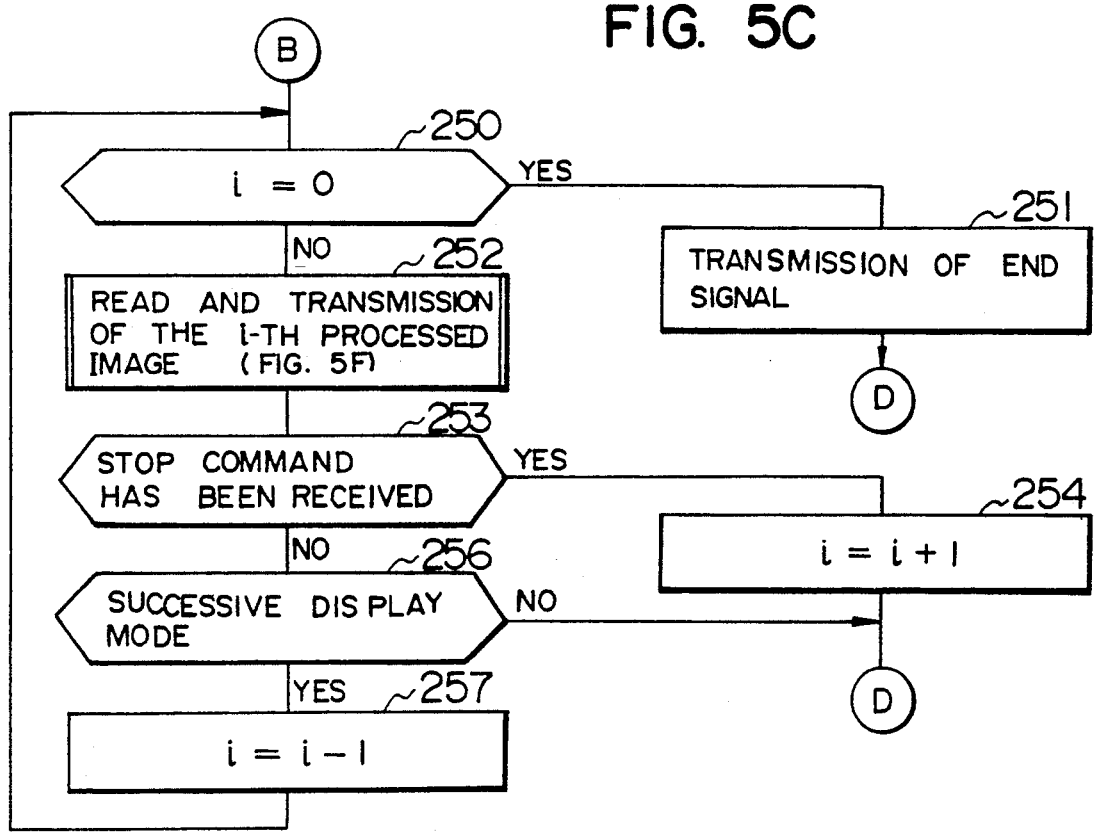

In the control sequence of FIG. 5C illustrating the reverse order page turning operation which requires image processing, the contents of step 250 for judging if all image data has been transmitted and the contents of steps 254 and 257 for renewing the value of the parameter i, are different from the corresponding steps of FIG. 5B. The other steps 251 to 253, and 256 are the same as steps 241 to 243 and 246 of FIG. 5B.

At steps 242 and 252, the sub-routine shown in FIG. 5F is executed. At step 300 the i-th image data is read from the image file 11B in accordance with the contents of the i-th record stored in the index table 35, and written in a first work buffer area for data read provided in the memory 7. After reading the i-th image data (step 302), the i-th image data is decoded by the decoding processor 10 to restore the original image data (step 304). The restored original image data is stored in a second work buffer area for data read provided in the memory 7. After the restore operation (step 306), the restored image data is processed by the image processor (step 308). If the processing type 51 stored in the table 50 indicates an extraction of a partial area, the partial area is extracted from the image data in accordance with the control data 52 to 57. The processed image data is stored in a third work buffer area provided in the memory 7. After the image processing (step 310), the processed image data is encoded by the coding processor 9, and inputted to the communication buffer memory in the communication controller 3 as the i-th compressed image data. If it is confirmed at step 314 that the coding processing has been completed, the i-th compressed image data is transmitted from the communication controller 3 to the terminal station (step 316). After the confirmation of transmission completion (step 318), the sub-routine is terminated.

Figure 5D:
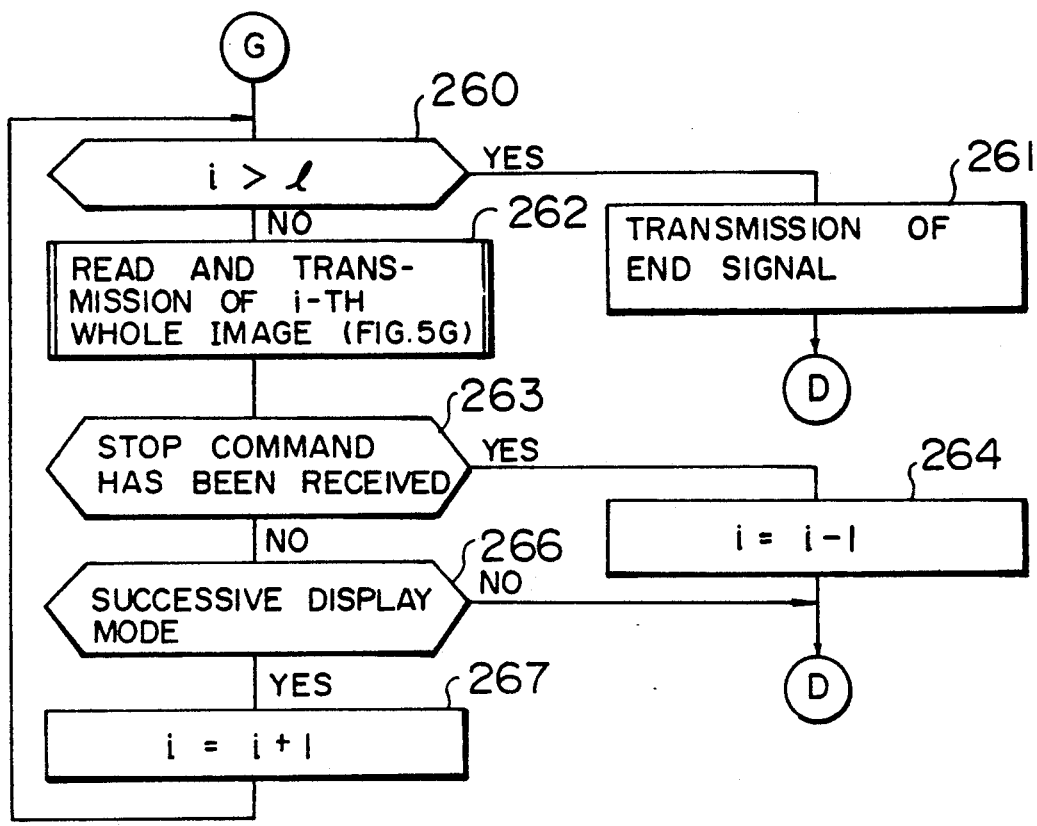

In the control sequence of FIG. 5D illustrating the regular order page turning operation for the whole image display mode which does not require image processing, steps 260 to 267 correspond to steps 240 to 247 shown in FIG. 5B, except that the contents of a subroutine (SUB-2) to be executed at step 262 differ from the sub-routine (SUB-1).

Figure 5E:
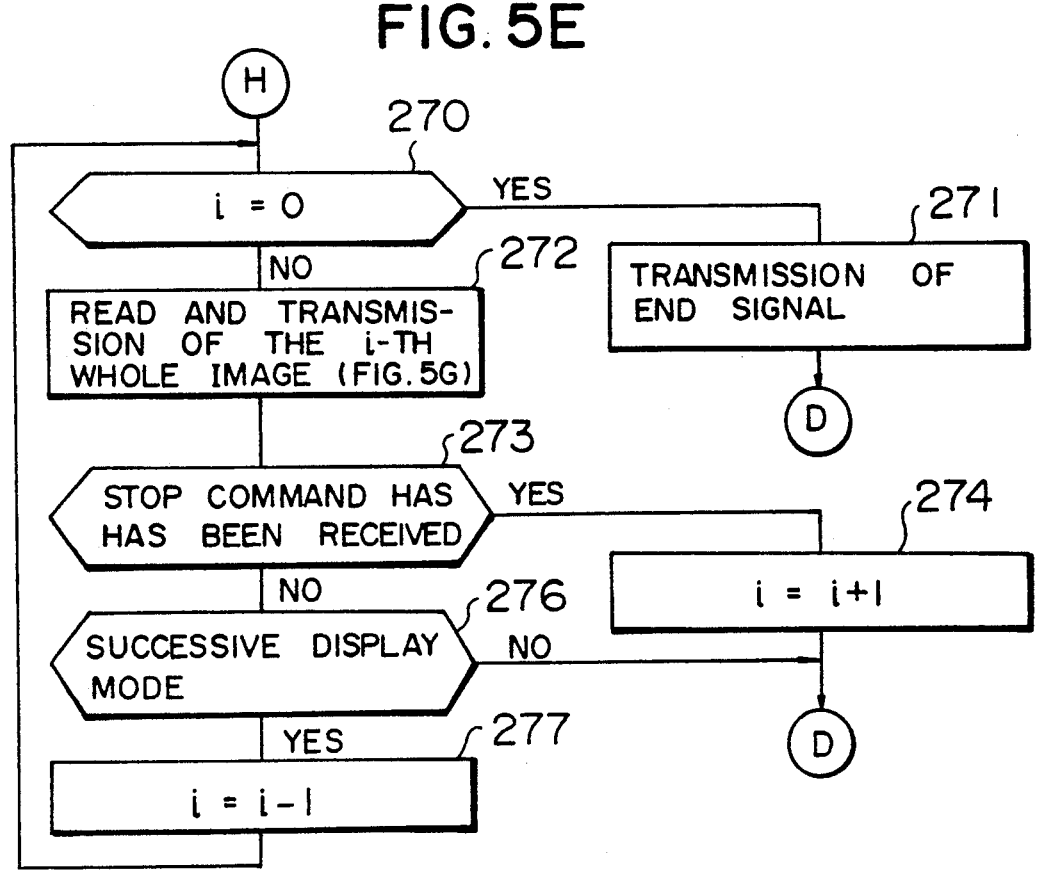
Figure 5F:
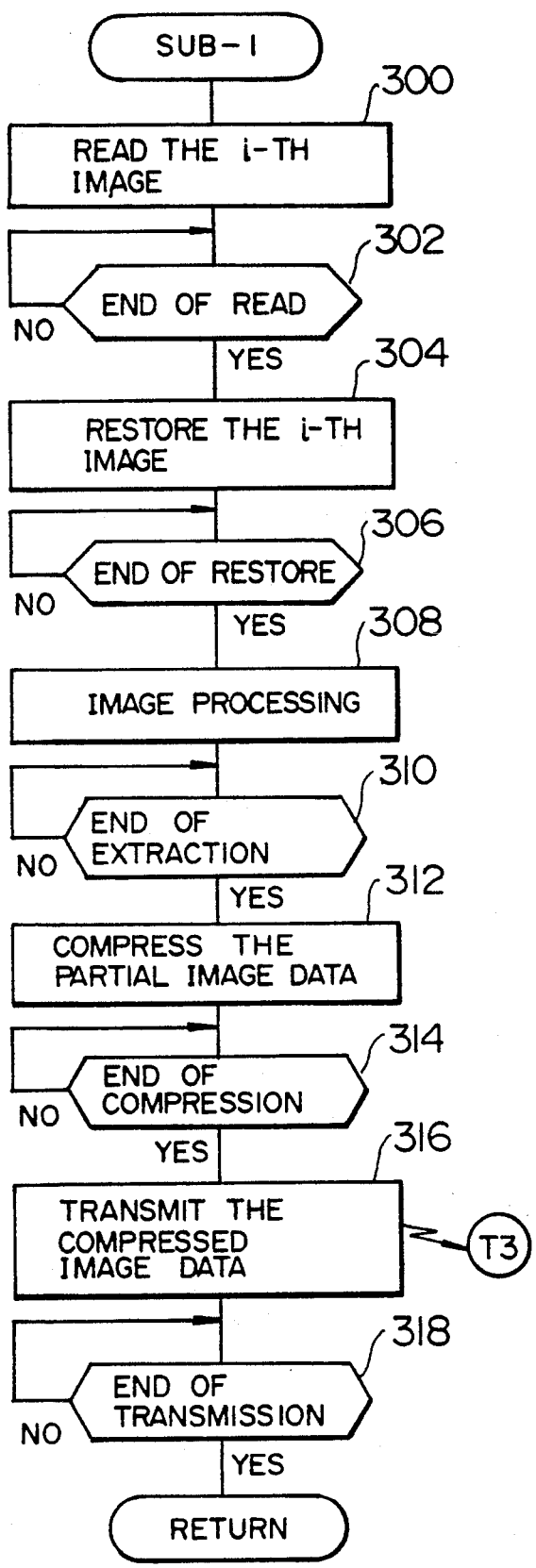
FIG. 5F is a flow chart illustrating the detail of a sub-routine to be executed at step 242 of FIG. 5B and at step 252 of FIG. 5C.

Similarly, in the control sequence of FIG. 5E illustrating the reverse order page turning operation for the whole image display mode, steps 270 to 277 correspond to steps 240 to 247 shown in FIG. 5C.

Figure 5G:
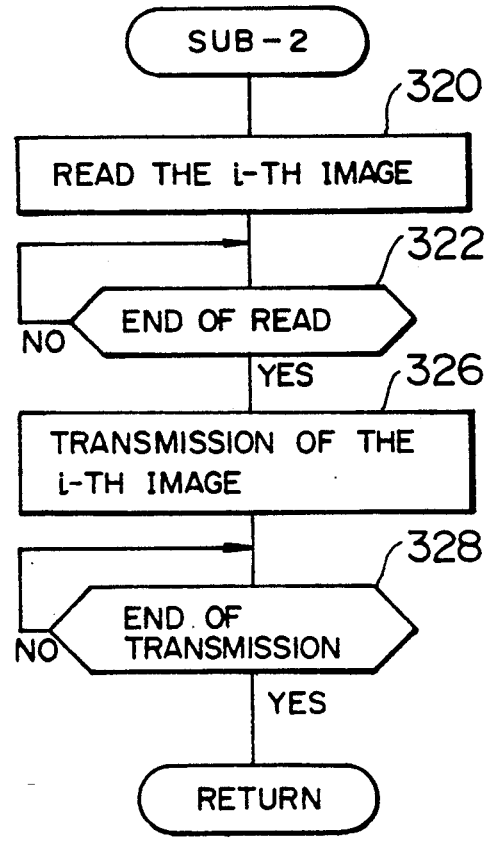
FIG. 5G is a flow chart illustrating the detail of a sub-routine to be executed at step 262 of FIG. 5D and at step 272 of FIG. 5E.

As shown in FIG. 5G, in the sub-routine (SUB-2) to be executed at steps 262 and 272, the i-th image data is read from the image file (step 320), after the confirmation of the end of the read operation (322) the i-th image data is transmitted to the terminal station (step 326), and after the confirmation of the end of the data transmission (step 328) the sub-routine is terminated.

Figure 9A:
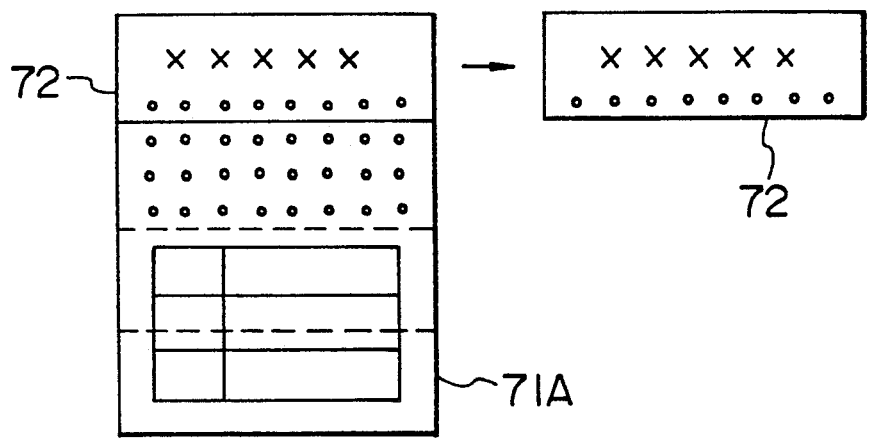
FIGS. 9A to 9C are diagrams showing examples of image processings executed by the file station.
Figure 9B:
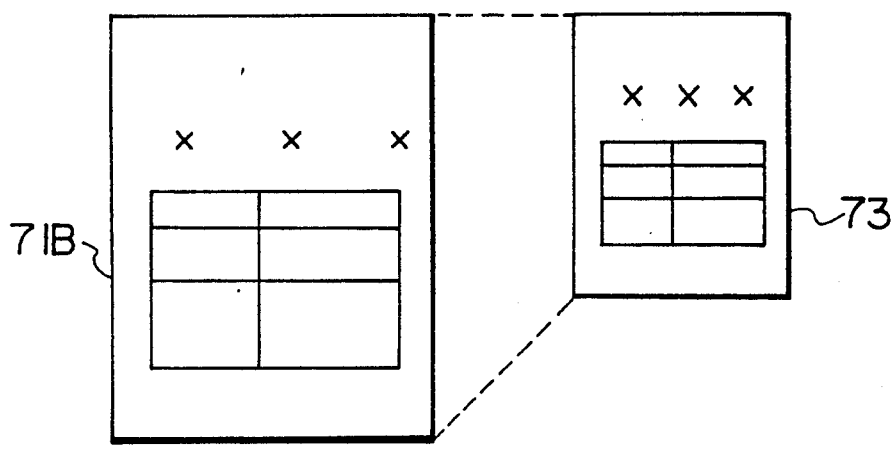
Figure 9C:
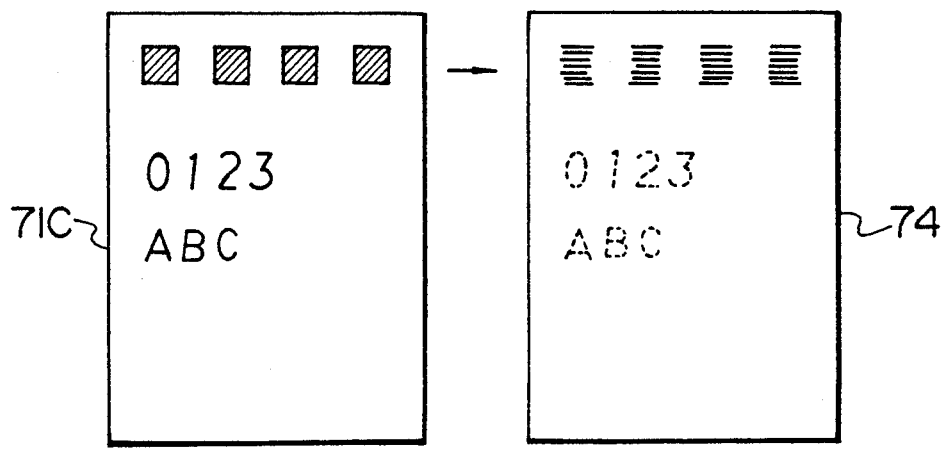

FIGS. 9A to 9C illustrate image processings by the image processor 5 according to other embodiments.

FIG. 9A illustrates the case where an image 71A is divided into n (n=4) areas of the same size, and one block, e.g., block 72, is extracted as a partial area and transmitted to the terminal station.

FIG. 9B illustrates the case where an original image is reduced and transmitted to the terminal station. In requesting a reduced image, an operator designates the reduced image designation mode and a reduction factor (a reduction ratio of an image 71B to an image 73).

FIG. 9C illustrates the case where scan lines for an original image 71c are thinned at a constant interval to reduce the transmission data amount, and an image 74 as shown is displayed at the terminal station.

In the above embodiment, an operator has supplied control information for defining a partial image to be displayed. Instead of designating the position and size of a partial image by an operator, another method may be used. Namely, a partial area representative of a characteristic area of each image is stored beforehand in a memory at the file station, and upon a partial area display instruction from an operator, the characteristic area definitely determined by each of the searched images is automatically extracted and transmitted to the terminal station.

Figure 10:
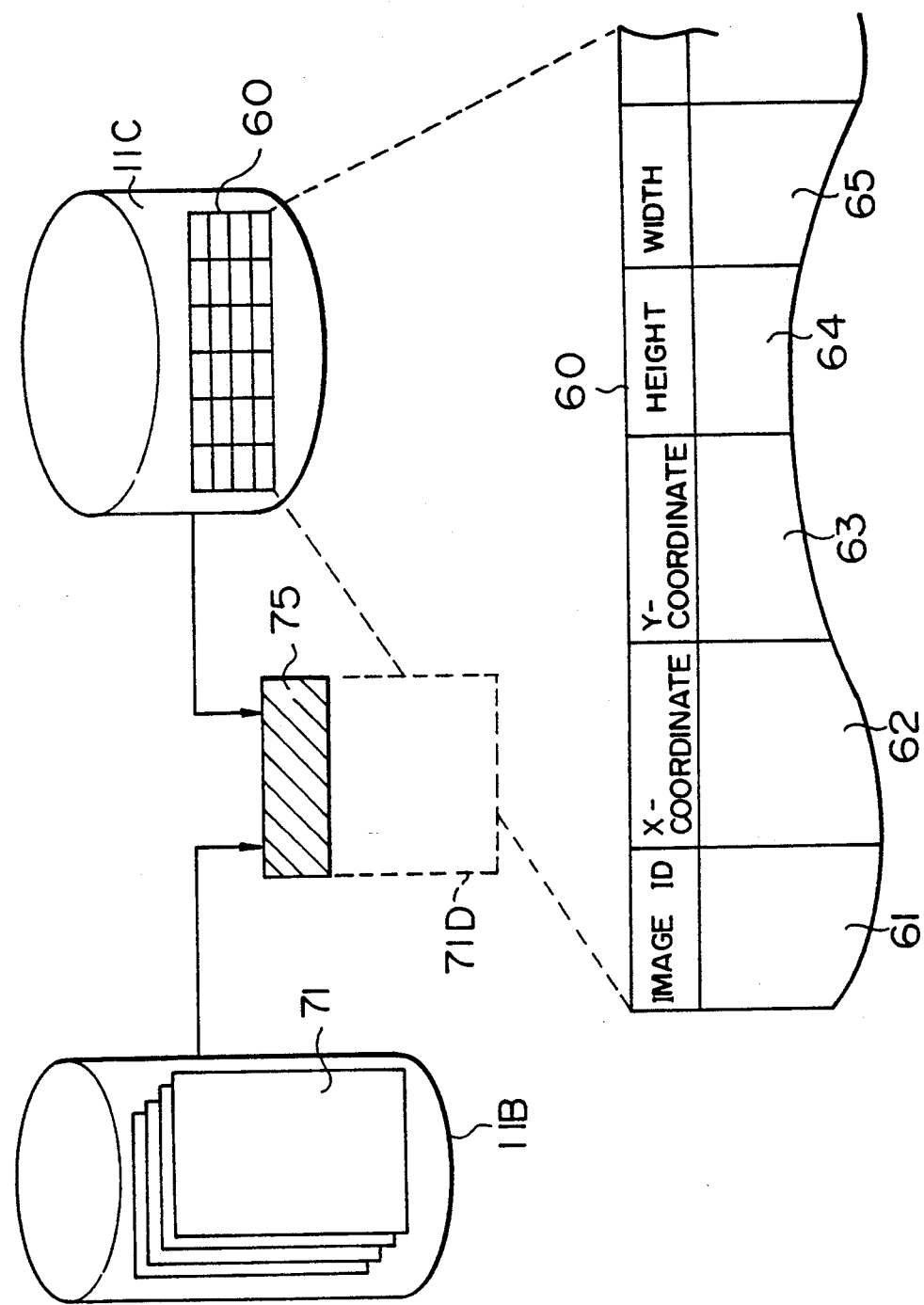
FIG. 10 illustrates how a partial image is extracted according to another embodiment.

FIG. 10 illustrates such an automatic extraction. Specifically, a table 60 is formed as an image attribute file 11c. The table 60 stores therein an image ID 61, the x- and y-coordinate values 62 and 63 of a representative point (intersection of the left and top sides) of the partial image, height 64 and width 65 of the partial image area. When an image 71D has been searched from the image file 11B at the file station during the partial image display mode, the image processing control information 62 to 65 corresponding to the searched image ID 61 are read from the file 11c. In accordance with the read-out control information, a partial image 75 is automatically extracted.

In the above embodiment, image data is transmitted from the file station to the terminal station in such a manner that a series of operations, starting from reading the i-th image from the image file to transmitting the i-th image to the terminal station, are first carried out and then a series of operations for the next (i+1)-th image are carried out.

In order to shorten the interval of turning images displayed on the display at the terminal station, image processing (including coding and decoding) of the i-th image and reading the (i+1)-th image from the image file 11B may be executed in parallel. To this end, there are provided at least a plurality of first work buffer areas for use in reading image data from the image file, second work buffer areas for use in storing outputs from the coding processor 9, and third work buffer areas for use in storing outputs from the image processor 5. The processors are therefore allowed to operate in parallel in such a manner that, for example, while the (i+1)-th image is written in one of the first work buffer areas, the i-th image stored in another first work buffer area is processed by the decoding processor.

FIG. 11 is a timing chart showing high speed image search operation by the file station.

In FIG. 11, S1 to S3 indicate the timings of the operation by the decoding processor 17, CPU 20 and communication controller 21 at the terminal station, S4 to S9 indicate the timings of the operation by the communication controller 3, CPU 4, image processor 5, decoding processor 10, coding processor 9, and file controller 12 at the file station. Reading the image data $D_A$ from the image file at the file station to displaying the data on the display screen of the terminal station are indicated by references 80A to 101A. Image data $D_B$, $D_C$, ... is displayed in a similar sequence on the display screen. When a read operation 80A of the image data $D_A$ from the image file 11B is completed, CPU 4 of the file station responds to a read end signal from the file controller 12 and instructs the decoding processor 10 to start the decoding operation of the image data $D_A$ (operation 90A). At this time, CPU 4 causes the data write area of the first work buffer to be changed, instructs the file controller 12 to read the next imaged data $D_B$. Then, in parallel with the decoding operation 91A, the read operation 80B of the image data $D_B$ is executed. In a similar manner, while changing the work buffer area to be used, operation commands are given to the sub-processors 5, 10, 9 and 12 to thereby allow a parallel operation among the image data read operation ($80_C$, the $80_D$, ...), decoding operation ($91_B$, $91_C$, ...), the image processing operation ($93_A$, the $93_B$, ...), coding operation ($95_A$, $95_B$, ...), and the image data transmission operation ($97_A$, $97_B$, ...).

According to another embodiment of a method of transmitting image data to the terminal station, as shown by arrows 150 to 153 in FIG. 11, under control of CPU 20 of the terminal station, when image data is received, a transmission request 150 for transmitting the next image data is sent to the file station. In response to this transmission request, the file station transmits the next image data.

What is claimed is:

1. An image information retrieval network system comprising a file station and at least one terminal station connected to said file station via a transmission line,
    said file station comprising:
        storage means for storing a plurality of pages of images in a form of compressed image data having a data length shortened through data coding;
        means for reading out page by page from said storage means said compressed image data requested by said terminal station;
        first decoding means for decoding page by page said compressed image data read out from said storage means to restore said compressed image data to original image data;
        image processing means for processing restored original image data received from said first decoding means page by page to convert said restored original image data into image data having a form requested by said terminal station;
        coding means for compressing said processed image data through data coding; and
        first communication means for transmitting as searched images said compressed image data read out from said storage means or said processed image data compressed by said coding means to said terminal station via said transmission line, and for receiving control information transmitted from said terminal station via said transmission line;
    said terminal station comprising:
        display means for displaying searched images;
        input means operated by an user for designating first control information and second control information, said first control information representing a condition of image search to be executed at said file station, and said second control information including information for designating a display mode used in displaying said searched images on said display means and information for specifying image processing to be executed at said file station;

second communication means for transmitting said first control information and said second control information to said file station via said transmission line and for receiving read out or processed compressed image data transmitted from said file station;

second decoding means for decoding each of said read out or processed compressed image data received by said second communication means to restore said original image data to said searched images; and means for outputting said image data restored by said decoding means to said display means;

wherein at said file station said image data is red out from said storage means in accordance with said first control information, and image processing by said image processing means and transmission of said read out or processed image data are executed in accordance with said second control information.

2. An image information retrieval network system according to claim 1, wherein said image processing means of said file station includes means for extracting a partial image area specified by said second control information by an user at said terminal station, from said image data restored by said first decoding means, whereby said compressed image data corresponding to said partial image are transmitted from said file station to said terminal station.

3. An image information retrieval network system according to claim 1, wherein said file station further comprises control means for controlling image data reading means, said first decoding means, said image processing means, said coding means and said first communication means, said control means rendering said plurality of controlled means to operate in a predetermined sequence and sequentially transmit said read or processed compressed image data to said terminal station, if user at said terminal station designates a consecutive transmission of a plurality of searched images with display mode designation information in said second control information.

4. An image information retrieval network system according to claim 3, wherein said control means includes means for controlling at least two of said image data reading means, said first decoding means, said image processing means, said coding means and transmission means to operate in parallel, if an user at said terminal station designates said consecutive image transmission mode.

5. An image data retrieval method for an image retrieval system including a file station with an image file which stores a plurality of images to be searched in a form of compressed image data having a data length shortened through data coding and at least one terminal station connected to the file station via a transmission line and having a display screen for displaying searched images, said method comprising the steps of:

indicating to said file station a search condition, a process mode which designates an image processing to be executed on searched images, and a display mode which designates a mode of outputting image data to said display screen;

reading out at said file station said compressed image data of image satisfying said search condition from said image file;

decoding at said file station each one of read-out compressed image data to restore said compressed image data to original image data;

subjecting at said file station each one of restored image data to an image processing designated by said process mode designated by said terminal station;

compressing at said file station each one of processed image data by data coding;

transmitting each one of processed, compressed image data from said file station to said terminal station in timings determined by said display mode;

decoding at said terminal station each one of said image data received from said file station; and outputting at said terminal station said decoded image data on said display screen successively.

6. An image data retrieval method according to claim 5, wherein said file station extracts in said subjecting step a partial image area designated by said process mode from each one of said image data whereby compressed image data of partial images are transmitted from said file station to said terminal station.

7. A document image retrieval system comprising a file station and at least one terminal station connected to said file station via a transmission line, said file station comprising:

storage means for storing a plurality of pages of document images in a form of compressed image data having a shortened data length resulting from data coding;

means for retrieving from said storage means said plurality of pages of document images;

first decoding means for converting each one of retrieved document images in said form of compressed image data into an original image data form through data decoding;

image processing means for processing each one of document images, each one of said document images having said original image data form, to obtain output document image data having a form designated by said terminal station;

coding means for converting said output document image data into a compressed image data form through said data coding; and first communication means for transmitting said each one of retrieved document image data of said retrieved document images and said compressed image data to said terminal station via said transmission line, and for receiving control information transmitted from said terminal station via said transmission line;

said terminal station comprising:

display means for displaying a plurality of searched images successively;

input means for inputting by an user said control information to designate a condition of an image search to be executed at said file station, a display mode of said searched images on said display means and process parameters for specifying an image process operation to be executed at said file station;

second communication means for transmitting said control information to said file station via said transmission line and for receiving said retrieved document image data or said compressed image data transmitted from said file station;

second decoding means for converting each one of said retrieved document image data received by said second communication means into an original image data form through data decoding; and means for successively outputting decoded document image data to said display means;

wherein at said file station document image data is retrieved from said storage means in accordance with said designated search condition, and image processing by said image processing means and transmission of said document image data from said file station are executed in accordance with said designated process parameters and display mode, respectively.

8. A document image retrieval system according to claim 7, wherein said image processing means of said file station includes means for extracting a partial image area specified by said process parameters from said document image restored by said first decoding means, thereby to deliver said searched images to said terminal station immediately.

* * * * *